UNITED STATES PATENT OFFICE.

JOHN H. SASSEEN, OF HOUSTON, TEXAS, ASSIGNOR TO UNITED FOOD PRODUCTS COMPANY, OF HOUSTON, TEXAS, AN ASSOCIATION.

FOOD COMPOUND AND PROCESS OF MAKING THE SAME.

1,401,498.  Specification of Letters Patent.  Patented Dec. 27, 1921.

No Drawing. Application filed September 28, 1920, Serial No. 113,358. Renewed November 18, 1921. Serial No. 516,247.

*To all whom it may concern:*

Be it known that I, JOHN H. SASSEEN, a citizen of the United States, residing at Houston, Harris county, Texas, have invented a certain new and useful Improvement in Food Compounds and Processes of Making the Same, of which the following is a full, clear, and exact description, such as will enable others skilled in the art to which it appertains to make and use the same.

My invention relates to a food compound which is designed to be a valuable ingredient in the making of other types of foods, such as pastry, ices and confectionery.

An object of my invention is to provide a compound which may be used in the manufacture of desserts, confectionery and similar foods which will be economical to manufacture and palatable to the taste.

The compound which I have invented is designed to fill a place in the preparing of food in the class with malted milk, gelatins, etc., and principally as an ingredient in the manufacture of other foods or as a dressing or sauce therefor. The name which I have given this compound is rice cream.

This food is made up of the following ingredients: A light flour, such as rice or tapioca flour or crushed rice; water; skimmed milk; and certain edible vegetable or animal fats such as cocoanut oil, peanut oil, cocoa fat, cottolene and butter fat. These ingredients are mixed in the following proportions:

Rice or tapioca flour___ 12 pounds;
Water _____ 66 pounds;
Skimmed milk _____ 25 pounds;
Fat_____ 8 pounds.

The ingredients mixed in this proportion are designed after treatment to form a bulk weighing about 100 pounds.

The process by which these ingredients are treated to form the finished product is as follows:

Take the water and rice flour in the proportions stated and thoroughly mix and boil the same until about one-sixteenth of the water has been evaporated. The resulting mixture of cooked rice flour and water is, when completed, formed into a pasty mass, having the consistency of an emulsion.

To this boiled rice flour is then added skimmed milk and one of the fats named, of which I prefer to use cocoanut oil. These are thoroughly mixed and heated, to form a uniform sterilized or pasteurized product.

The mixture is then emulsified. This is done preferably by passing the product through a homogenizing machine at a temperature of about 100° F. The action of the homogenizing machine is to force the product through a constricted valve-closed orifice so as to blend the ingredients in such a manner that they will not again separate. This type of machine is well known and in common use. Its purpose is to make a homogeneous mixture which will remain in that state. The emulsion thus produced is of a heavy liquid form of about the consistency of condensed milk and in this form may be used in the manufacture of different foods. While still hot it is placed in sealed containers and will keep indefinitely. It is contemplated that in most of the uses to which this product is put, a sweetening shall be added and the food flavored as desired. Such flavoring may be of any common and well known form, preferably the fruit flavors.

This food ingredient may be used in the manufacture of ices and different frozen dainties and in the manufacture of pastry, such as pies. It acts as a filler when so used and adds materially to the product. It may also be used as a sauce or dressing, when sweetened and flavored, for ices, puddings, cereal foods, etc. In the manufacture of candy, it also finds an important use as a filler. Various other similar uses will be found for this food compound and it is believed that such uses will be apparent to one skilled in the art. It will also be obvious that the principal ingredients of my improved food are cheap and abundant and that the food will therefore be economical to manufacture.

Having thus described my invention, what I claim as new and desire to protect by Letters Patent is:

1. A food compound comprising an emulsion of 12% rice flour, 55% water, 25% skimmed milk and 8% edible fat.

2. A food compound comprising a mixture including approximately: 12 per cent. of flour, 55% of water, 25% of skimmed milk and 8 per cent. of cocoanut oil.

3. In the formation of a food compound, the improvement consisting of mixing 12 pounds of a light flour, about 66 pounds of water, and boiling the mixture to evaporate approximately 11 pounds of water, adding to the resulting mixture 25 pounds of skimmed milk and 8 pounds of edible fat and emulsifying the resulting product.

4. The process of making a food ingredient comprising thoroughly cooking 12 pounds of crushed rice in water until the ratio of the ingredients is approximately 12 pounds of rice to 55 pounds water, then adding 25 pounds of skimmed milk and 8 pounds of cocoanut oil and then heating and emulsifying the mixture.

5. A food ingredient consisting of an emulsion of cooked rice, water, skimmed milk and fat in which rice is present in approximately the proportion of 12%.

6. The process of making a food compound, consisting of thoroughly cooking a quantity of rice in water, then adding milk and a small quantity of fat and heating and emulsifying the resulting mixture.

In testimony whereof, I hereunto affix my signature, this the 25th day of September, A. D. 1920.

JOHN H. SASSEEN.